United States Patent [19]

Siegel

[11] 4,126,781

[45] Nov. 21, 1978

[54] METHOD AND APPARATUS FOR PRODUCING ELECTROSTATIC FIELDS BY SURFACE CURRENTS ON RESISTIVE MATERIALS WITH APPLICATIONS TO CHARGED PARTICLE OPTICS AND ENERGY ANALYSIS

[75] Inventor: Melvin W. Siegel, Pittsburgh, Pa.

[73] Assignee: Extranuclear Laboratories, Inc., Pittsburgh, Pa.

[21] Appl. No.: 795,614

[22] Filed: May 10, 1977

[51] Int. Cl.[2] .......................... B01D 59/44; H01J 39/34

[52] U.S. Cl. ...................................... 250/281; 250/282; 250/305; 250/396 R

[58] Field of Search ............... 250/281, 282, 294, 305, 250/396 R; 313/360, 361

[56] References Cited

U.S. PATENT DOCUMENTS

| | | | |
|---|---|---|---|
| 2,313,018 | 3/1943 | Krause | 250/396 |
| 3,760,186 | 9/1973 | Staib | 250/305 |
| 3,914,606 | 10/1975 | Hashimoto et al. | 250/305 |
| 3,936,634 | 2/1976 | Fite | 250/281 |
| 4,002,912 | 1/1977 | Johnson | 313/361 |

*Primary Examiner*—Alfred E. Smith
*Assistant Examiner*—B. C. Anderson
*Attorney, Agent, or Firm*—Mason, Mason & Albright

[57] ABSTRACT

Electric fields for electrostatic optics for focusing or otherwise controlling beams of ions, electrons and charged particles in general produced by surface current distributions which flow on appropriately shaped and located resistive elements from electrical power sources of appropriate voltage connected to two or more points or regions of the resistive surfaces; the resulting electric fields in the proximity of the current carrying surfaces are parallel to these surfaces. Useful electric field configurations may be produced which are inconvenient or impossible to produce by the prior art using surface charge distributions. New and improved analyzers of "concentric hemisphere" and "parallel plate" types are specifically utilized for ion kinetic energy selection prior to measurement of the mass-to-charge ratio of secondary ions produced by primary ion bombardment of surfaces.

59 Claims, 9 Drawing Figures

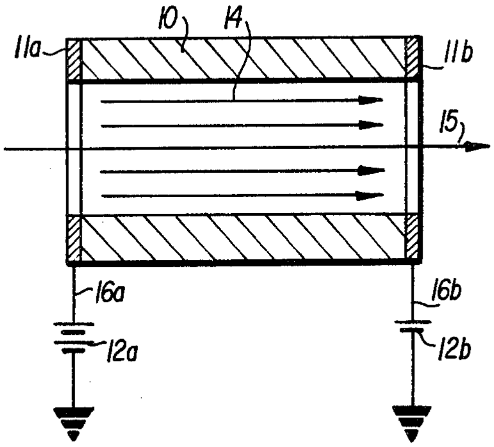
FIG. 1A
FIG. 1B
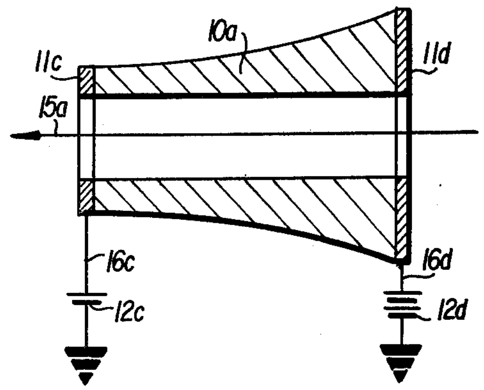
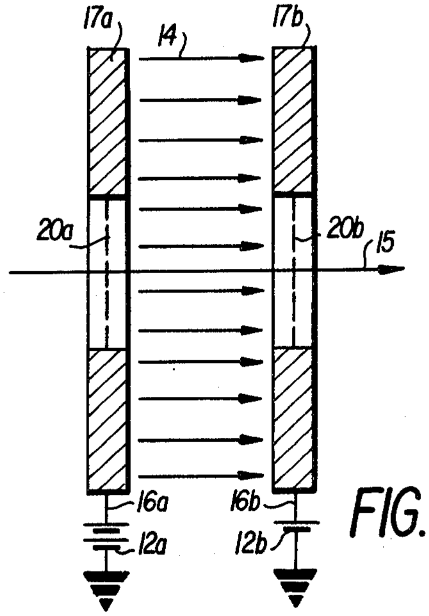
FIG. 2A
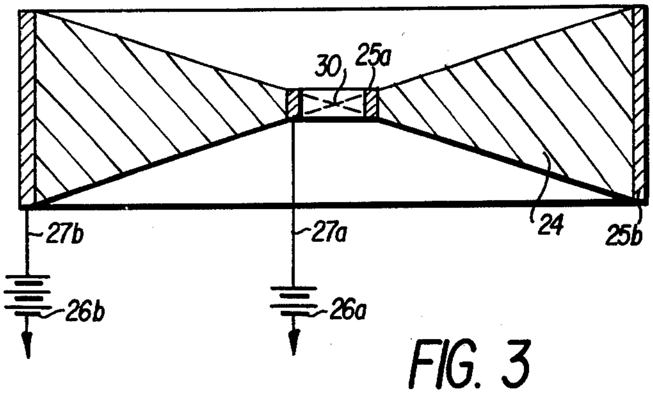
FIG. 3
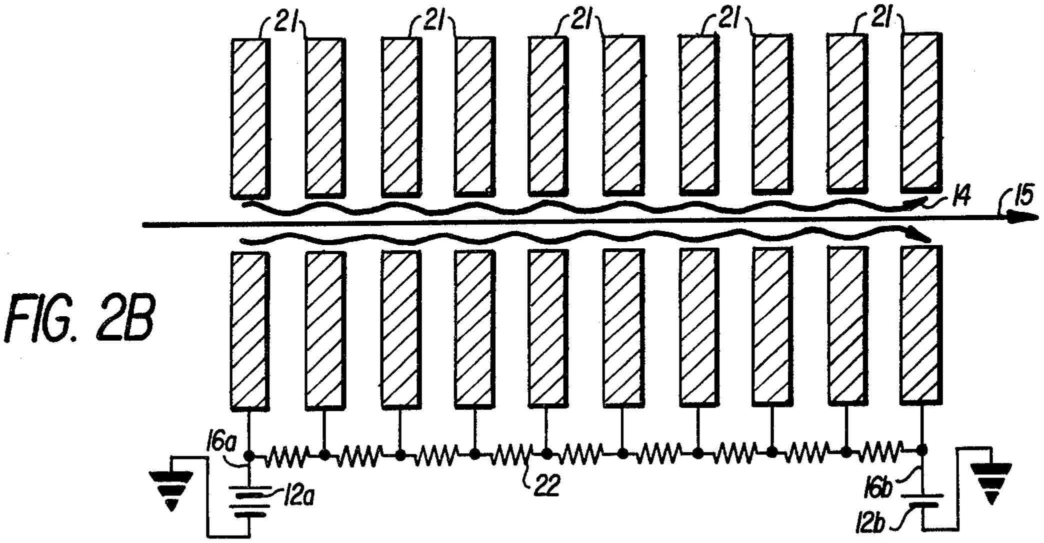
FIG. 2B

METHOD AND APPARATUS FOR PRODUCING ELECTROSTATIC FIELDS BY SURFACE CURRENTS ON RESISTIVE MATERIALS WITH APPLICATIONS TO CHARGED PARTICLE OPTICS AND ENERGY ANALYSIS

BACKGROUND OF THE INVENTION

1. Field of Invention

The invention relates to generating shaped electric fields for use as electrostatic lenses and other charged particle optic devices. In particular, surface currents on resistive materials to shape electric fields are employed, by means of which a charged particle beam in the adjacent vacuum or other ethereal medium is focused, deflected, or otherwise controlled or manipulated. "Other ethereal medium" is, for most envisioned applications a high vacuum. However, for operable purposes "ethereal medium," as utilized herein, is intended to apply to mediums having substantially an infinite resistivity and through which charged particles may traverse. For the purposes of charged particle energy spectrometry, the invention is applied to improved types of energy analyzers with specific application in the field of Secondary Ion Mass Spectrometry.

2. Discussion of the Prior Art

In the prior art of electrostatic optics for manipulating the trajectories of ions (the term "ion" hereafter understood to include all charged particles such as conventional positive and negative ions, electrons, subatomic particles, and charged macroscopic particles such as dust grains) the required electrostatic fields are generated by surface charge distributions placed on appropriately shaped and located isolated metallic conducting surfaces. Such charges are placed on the surfaces by means of external voltage sources, which establish the electric potential of each isolated surface. In principle, once a surface has been charged to the required electric potential the external voltage source can be disconnected from the isolated metallic conducting device; however, in practice, leakage effects usually require that a connection to the voltage be maintained.

According to Maxwell's Equations for electromagnetic fields, a steady state electric field due to surface charges on metallic conductors such as used in the prior art, intersect the charged surfaces at right angles; hence in the vicinity of each surface the electric field is perpendicular to that surface. This restriction in the prior art that only electric fields perpendicular to their generating surfaces are produced, has been frequently recognized because often a desired field shape can be produced only by locating generating surfaces in regions where they interfere with the free passage of the ion beams, thus negating or limiting the value of the device. Attempts have been made to overcome this restriction by employing a multitude of metallic parts close to but insulated from each other in a precise mechanical array, each held at an externally fixed potential differing from the potential of its neighbors in an orderly progression. Apparatus of this type is usually expensive and difficult to fabricate, and may only partially satisfy the requirements. Specifically, in the prior art of 180° deflection concentric hemispherical ion energy analyzers, a problem which results in undesirable fringe fields has been approached by making the gap between the hemispheres small and by employing guard elements in the entrance and aperture regions. Drawbacks of these techniques are reduced angular acceptance and increased mechanical complexity.

SUMMARY OF THE INVENTION

It is well known that, in the absence of any time-varying magnetic fields, any electric field distribution can be conveniently expressed in terms of a scalar potential $\phi$ by $$\vec{E} = -\nabla\phi$$

the potential being a solution to Poisson's Equation $$\nabla^2\phi = -\rho/\epsilon$$

where $\rho$ is the charge density in coulombs-meter$^{-3}$, $\epsilon$ is the permittivity of the vacuum or medium in farads-meter$^{-1}$, and $\phi$ is thus in volts and $\vec{E}$ is the electric field in volts-meter$^{-1}$. An important special case of Poisson's Equation is Laplace's Equation, $$\nabla^2\phi = 0$$

which is applicable to regions in which there is no net charge.

It is of interest to inquire as to the solutions of Poisson's Equation or Laplace's Equation within closed volumes, for example, in the vacuum region inside a closed chamber evacuated by vacuum pumping apparatus and outside any solid material objects within the chamber. In most cases of practical application, the charge density in the space of the vacuum is negligibly small so only the solution of Laplace's Equation need be considered. There are some situations, such as when very intense ion beams pass through the vacuum, when it is necessary to consider the effect of the space charge and the solution of Poisson's Equation must then be sought. We will, however, omit these from consideration inasmuch as they complicate the discussion while introducing no important exceptions to the general concepts.

Within such an enclosed volume it is well known that the particular solution of Laplace's Equation, which correctly describes the electric potential there (and thus the electric field also), is determined once the electric potential is specified on all points of the boundary surfaces. This constitutes the practice of the prior art, in which the relevant surfaces are all metallic conductors on which the electric potentials are established according to the practical requirements. Electrical sources are utilized to obtain the desired surface charge densities on the metallic conducting surfaces.

However, it is also possible to determine the electric potential within the volume (except for an arbitrary additive constant), and thus to determine the electric field therein, by specifying the electric field on all points of the boundary. Furthermore it is permissible to specify the electric potential on some parts of the boundary and the electric field on the remaining parts of the boundary, in which case the electric field is still determined everywhere in the volume. An important concept of this invention is that it produces a well defined electric field parallel to and along part of the boundary surface, thus specifying the boundary conditions on the solution to Laplace's Equation in part by the electric field rather than by the electric potential at the boundary. This is accomplished, as will be discovered subsequently, by causing specified surface currents to flow over portions of the boundary surface, in contrast to the prior art in electrostatic optics of defining the electric potential by causing specified surface charge densities to reside on all portions of the boundary.

The required electric currents for the implementation of this method are in principle derived from electrical power or current sources, the voltages of which are determined by the products of the required currents and the electrical resistances between points or regions of electrical contact on the surfaces. In practice, however, it is often more convenient to fix the potentials at the points or regions of electrical contact by means of electrical voltage supplies of low output impedance so that their output voltages are not decreased by virtue of their being required to supply the required currents. This second method has certain practical advantages which will become more apparent as the discussion proceeds.

A major utility of this invention in ion optics is that some useful electric field shapes, which may be difficult to produce by means of electric potential distributions on the boundaries, are relatively simple to produce by means of surface current distributions on the boundaries. Furthermore, it is frequently the case that when a desired field shape can be produced by means of electric potential distributions, the required metal surfaces must be located in such a way that the usefulness of the resulting field shape is negated by the necessity that these surfaces obstruct the free passage of ions, the trajectories of which then intersect those surfaces. Because of the different geometrical constraints between fields originating on surface current distributions on one hand and surface charge distributions on the other, these problems can often be overcome by replacing an electric potential distribution with a current distribution. This is illustrated by the following example:

Assume that it is desired to accelerate a beam of ions from an initial energy of $q\phi_1$ to a final energy of $q\phi_2$, where the electric potential $\phi$ is implicity defined to be zero at the location where the ions are born with charge $q$. A desirable means of accomplishing this is to accelerate the ions by a uniform electric field which would exist between two thin metal disks parallel to each other oriented perpendicular to the ion beam propagation direction, and separated by any convenient distance small compared to their diameter, with the first or "upstream" plate being held at potential $\phi_1$ volts and the second or "downstream" plate being held at potential $\phi_2$ volts. This configuration would work very well if the metal plates were transparent to the ion beam. In reality, however, such transparent plates do not exist. In the prior art this difficulty has been partially overcome by replacing solid metal disks with fine mesh, but because of field-fringing effects and the incomplete transparency of even very fine mesh this is not an entirely satisfactory solution. An alternative solution, the subject of this invention, is to use instead of two metallic disks a cylindrical tube of resistive material, long compared to its diameter, having a longitudinal axis which is coincident with the propagation of the ion beam. If the first or "upstream" end of the tube is connected to a power supply of voltage $\phi_1$, and the second or "downstream" end of the tube is connected to a power supply of voltage $\phi_2$, then a current equal to the voltage difference $(\phi_2 - \phi_1)$ divided by the resistance between the ends of the tube results. It will presently be shown that the current in the resistive material causes an electric field inside the tube having the same uniform field shape (except for unimportant end effects) as would exist between the two metal disks described. However, with the resistive tube, the ends are fully open, and thus unlike the disks the tube allows the unrestricted passage of the ion beam.

For practical implementation of this concept, resistive materials, such as amorphous carbon, ferrites, materials known as "leaky dielectrics" and even certain rocks such as limestone, sandstone, mica, shale, and igneous rocks such as granite and lava, are preferred. For most applications, there are materials having resistivity values of $10^3$ to $10^6$ ohm - cm. For special applications, materials with resistivity values $10^8$ or even $10^{10}$ ohm - cm in some situations on the high side and to $10^{-4}$ ohm - cm on the low side wherein graphite, for example, is used as the resistive material in the invention. Amorphous carbon is desirable from a commercial standpoint to the extent that its bulk resistivity is controlled in the manufacturing process.

The term "leaky dielectric" is applied in the art to substances such as in a condenser wherein the insulation resistance is so far below normal that leakage current flows; it is also sometimes applied to ceramic insulators wherein the resistance decreases with an increase in the frequency of applied voltage. Whether a dielectric is "leaky" thus depends to a certain degree on the operating frequency of the dielectric. A "leaky dielectric" may be a ferrite, a ceramic; a semiconductor; a conducting glass; or the like. "Rock" is usually composed of silica minerals in which silicon and oxygen are combined with one or more metals. In the lower zone of the crust of the earth, the predominant metals are iron and magnesium and rock in such zone is essentially a ferromagnesium silicate. Nearer to the surface, aluminum tends to replace the heavier metals and the rock becomes predominantly aluminum silicate. In the upper portions of the earth's crust, silicates constitute about 75 percent of the rock content, aluminum about 8 percent; iron about 5 percent; and another 10 percent consists of calcium, sodium, potassium, and magnesium. Other natural elements constitute usually less than 2 percent. Although numerous exceptions exist, sedimentary rocks tend to have the lowest resistivity and metamorphic rocks tend to have the highest resistivity with igneous rocks falling in between.

Such resistive materials are capable of supporting an internal electric field in response to which a current flows according to the relationship $$\vec{j} = \sigma\vec{E}$$

where $\vec{j}$ is the current density in amperes-meter$^{-2}$, and $\sigma$ is a scalar constant characteristic of the material called the conductivity (the reciprocal of the resistivity), and measured in ampere-volt$^{-1}$-meter$^{-1}$, also known as mho-meter$^{-1}$ or (ohm-meter)$^{-1}$. This relationship is the microscopic form of Ohm's Law $$I = (V/R)$$

where $I$ is the total current in amperes flowing through a path of resistance $R$ ohms in response to a voltage difference $V$ volts. The microscopic and macroscopic relationships are related via the definitions $$I = \int_S \vec{j} \cdot \vec{ds}$$

where the surface integral is taken on any cross section of the resistor between the electrical contacts, and $$V = \int_1^{2} \vec{E} \cdot \vec{dl}$$

where the line integral is taken along any path through the resistor connecting the electrical contacts. From these relationships it follows that for a resistor of arbitrary shape $$R = \frac{1}{\sigma} \frac{\int_1^{2} \vec{j} \cdot \vec{dl}}{\int_S \vec{j} \cdot \vec{dS}}$$

It will be appreciated that this is a generalization of the relationship $$R = (L/\sigma A)$$

well known for a resistor of uniform cross section A and distance between contacts L. It is useful to consider the implications of these facts in the context of establishing some desired electric field in an ion-optic region.

If an appropriately shaped object of resistive material forms part of the boundary surface of an ion optic region in a vacuum (or other non-conducting etherial medium such as a gas) and if a current flows in the resistive material by means of appropriately attached conducting contacts to power supplies maintaining appropriate predetermined potentials as discussed above, then along the surfaces of the resistive material the direction of the current density field is parallel to those surfaces. This follows mathematically from the requirement that the charge be conserved, so that $$\nabla \cdot \vec{j} = -(\delta\rho/\delta t)$$

Under steady state conditions the charge density $\rho$ must have a time derivative of zero, so that $\nabla \cdot \vec{j} = 0$. With no current flow in the adjacent ethereal medium, it follows that the component of the current density field perpendicular to the boundary must be zero which requires that the current density field at the boundary be parallel to the boundary surface.

It thus follows from Ohm's Law in its microscopic form that the electric field at the boundary surface just inside the resistive medium must be parallel to the boundary surface, and this is given by $$\vec{E} = (\vec{j}/\sigma) = -\nabla\phi$$

Furthermore it is required by the previously discussed relationship, $$\nabla \times \vec{E} = 0,$$

that at the boundary surface just outside the resistive medium the electric field have the same magnitude and direction as that just inside the resistive medium. Thus both in and just outside the boundary $$-\nabla\phi = (\vec{j}/\sigma)$$

even though $\vec{j}$ exists only inside and on the surface of the resistive medium. Hence, the electric field in the ethereal medium is determined by the boundary conditions specifying $-\nabla\phi$, which is $\vec{E}$, on the boundary surface.

In the light of these general considerations, ion optic devices may be produced whereby electric fields in an ethereal medium such as a gas or vacuum are shaped as required by their intended function by shaping and controlling the electric current density in a substance such as amorphous carbon or other materials previously mentioned which forms part or all of the boundaries of or within an ethereal medium such as vacuum or gas wherein ion trajectories are affected. The shaping and controlling of the electric current density distribution may be accomplished in a variety of means anywhere intermediate between two extremes: (a) the substantive medium is of completely uniform resistivity, and the current density is shaped, as required by the application, by fabricating the bulk mechanical parts to specific geometries, and (b) the substantive medium is of simple geometry, in the extreme simply a thin layer of resistive material deposited on an appropriately shaped insulating substrate, and the current density distribution in this thin layer is shaped as required by the application by producing local or systematic variations in the surface resistivity such as by controlling the concentration of certain impurities or dopants, or by varying the thickness of the layer. Essentially the same methods that have utility in the semi-conductor art wherein impurities are selectively introduced in a pure substrate may be employed for this purpose. These methods include alloying, thermal diffusion and ion implantation. The latter method involves the impacting of ions of the impurity element on the pure substrate, the ions having a predetermined kinetic energy whereby their penetration depth is reasonably predictable. For example, with a non-metallic substrate of a Group IV A elements ions of one or more Group IIIA or Group V A elements are impacted at a given kinetic energy on the substrate to produce a desired pattern of varying resistivity along the substrate.

Utilizing the described concepts, the following describes a new apparatus having properties similar to the 180° deflection concentric hemispherical device conventionally used to select ions according to their energy.

A right cylindrical disk of amorphous resistive material, say 10 cm in diameter and say 0.25 cm in height, is further machined, symmetrically in both faces, with concave conical tapers which converge so that the material is of zero thickness at the exact center while retaining its original 0.25 cm thickness at the edges. Next, a right cylindrical hole of say 1 cm in diameter is bored through the center. Then, electrical connections are applied to the inner and outer cylindrical surfaces by means of metallic conductive coatings. A source of electromotive force is next used to provide a current which flows radially between inside and outside cylindrical surfaces. The current density in this device may be shown to vary inversely as the square of the distance from the cener, independent of the dimensional details, as long as the conical shape is preserved.

For the purposes of illustrating the applicable calculations, the outer radius of the described device is designated $R_o$, which in this example is 5 cm; the inner radius is denoted $R_1$, which in this example is 0.5 cm; and the thickness at the outer radius is $T_o$, which in this example is 0.25 cm. The thickness of the device, which is identified as T, at all intermediate values of the radius, denoted generally by *r*, is derived by means of simple proportions:

$$T = T_o (r/R_o)$$

Upon providing electrical connections between metallic conducting coatings on the inner radius and the outer radius, a current I caused to flow between the peripheries of such radii by means of an electromotive force, has a current density calculated as follows:

$$\vec{j} = \frac{I}{2\pi r T}\hat{r}$$

which is equivalent to $$\vec{j} = \frac{I R_0}{2\pi r^2 T_0}\hat{r}$$

where $\hat{r}$ is a unit vector radially outward from the center.

It has been previously shown that in general the resistance is given by $$R = \frac{1}{\sigma}\,\frac{\int_1^2 \vec{j}\cdot\vec{dl}}{\int_S \vec{j}\cdot\vec{dS}}$$

Therefore, it follows that in this example the resistance between inner and outer radius is $$R = \frac{1}{\sigma}\,\frac{\int_{R_1}^{R_0} \frac{I R_0}{2\pi r^2 T_0}\hat{r}\cdot\vec{dl}}{\int_S \frac{I R_0}{2\pi r^2 T_0}\hat{r}\cdot\vec{dS}}$$

which is $$R = \frac{1}{2\pi\sigma T_0}\left(\frac{R_0}{R_1} - 1\right)$$

It further follows that with the electromotive force which causes the current to flow between the inner and outer radii having a voltage V, then by using the macroscopic form of Ohm's Law $I = V/R$ $$I = \frac{2\pi\sigma T_0 V}{\left(\frac{R_0}{R_1} - 1\right)}$$

whereby $$\vec{j} = \frac{\sigma V}{\left(\frac{1}{R_1} - \frac{1}{R_0}\right) r^2}\hat{r}$$

The current density is thus calculable in terms of only known or imposed quantities of the material, its geometry, and the applied voltage.

From the microscopic form of Ohm's Law it follows that the electric field in the resistive material is $$\vec{E} = \frac{V}{\left(\frac{1}{R_1} - \frac{1}{R_O}\right) r^2}\hat{r}$$

Accordingly, it will be recognized that the form of the electric field in the resistive medium is the same form required in a 180° deflection energy analyzer, which in the prior art has been produced by means of fixed potentials applied to concentric hemispheres, the inner one convex and the outer out concave. It will be further appreciated that an appropriate $1/r^2$-electric field exists not only in the resistive material but also in the nearby space in view of the conservative nature of the electric field via the simplified Maxwell Equation $\nabla \times E = 0$.

To use the device as an ion energy analyzer, it is necessary to specify the radius $r_0$ at which the diametrically opposed entrance and exit apertures will be located, and to specify the ion energy to be selected. Convenient but arbitrary values for this example are $r_0 = 2.25$ cm, which is halfway between the inner and outer radii, and a typical ion energy $W = 10$ eV. The value of V is determinated from the above relationships, taking into account the requirement that energy focusing is obtained when $$\frac{2W}{r_0} = \left|\vec{E}(r_0)\right|$$

whereby $$V = 2W r_0\left(\frac{1}{R_1} - \frac{1}{R_0}\right)$$

which evaluates to $$V = 81 \text{ volts}$$

The potential difference between any two points located at radii $r_1$ and $r_2$ is given by $$\int_1^2 \vec{E}\cdot\vec{dr} = -\frac{\left(\frac{1}{r_2} - \frac{1}{r_1}\right)}{\left(\frac{1}{R_1} - \frac{1}{R_0}\right)} V$$

It therefore follows that the absolute potentials $V_0$ and $V_1$ are given by $$V_1 = W - \frac{\left(\frac{1}{R_1} - \frac{1}{r_0}\right)}{\left(\frac{1}{R_1} - \frac{1}{R_0}\right)} V$$

and

-continued $$V_0 = W + \frac{\left(\frac{1}{r_0} - \frac{1}{R_0}\right)}{\left(\frac{1}{R_1} - \frac{1}{R_0}\right)} V$$

which gives the result $$V_0 - V_1 = V$$

by subtraction of the first expression from the second.

From these formulas it follows by substitution of appropriate numerical values that the required voltage on the inner radius is $V_1 = -60$ volts and the required voltage on the outer radius is $V_0 = +21$ volts, their difference being 81 volts as required.

It is further necessary to inquire as to the required current and also the maximum power dissipation to determine whether or not the calculated values are practical. To do this, it is necessary to select a suitable value for the conductivity; for example, $10^{-6}$ (ohm-cm)$^{-1}$ is selected as typical. The following result is obtained $$I = \frac{2\pi\sigma T_0 V}{\left(\frac{R_0}{R_1} - 1\right)} = 1.4 \times 10^{-5} \text{ amps,}$$

which is sufficiently small value easily supplied by suitable power supplies. At the same time it is sufficiently large value that it will not be significantly changed by the rejected ion current collected by the device.

The maximum power dissipation per unit volume, given by $\vec{J}\cdot\vec{E}$ (which is the microscopic form of the formula for macroscopic power dissipation, $P = IV$), occurs in the vicinity of the inner radius where the current density and electric field are both at their maximum values. At the inner radius $$\vec{j} = \frac{IR_o}{2\pi R_1^2 T_o} = 1.8 \times 10^{-4} \text{ amp-cm}^{-2}$$

and $$\vec{E} = \frac{R_o}{\left(\frac{R_o}{R_1} - 1\right)} \frac{V}{R_1^2} = 180 \text{ volt-cm}^{-1}$$

which indicates that the maximum power dissipation is 0.0324 watts-cm$^{-3}$, which is well within the capability of available materials.

Although for purposes of illustration the tapering of the device has been described as symmetrical from both sides; in practice a taper into only one side of the disk is machined which maintains the same current density distribution as for a symmetrically machined disk.

Another apparatus, which utilizes the foregoing concepts, for the selection of ions according to their energy is as follows.

The well known parallel-plate mirror analyzer receives ions focused into the entrance aperture at a 45° angle of incidence and refocuses a selected portion of the incident ions which are in an energy band centered at energy, $$eW_o = (eVd/2D)$$

into the exit aperture, from which they emerge at an angle of reflection of 45°. In this expression $e$ is the ion charge, V the voltage between the plates, $d$ the separation between entrance and exit apertures, and D the separation between the plates. To prevent undesirable fringe field effects, in practice the length and width of the plates are large compared to the spacing $d$ between apertures. The practical disadvantage of using large plates, which at best only partially overcome the fringe field problem, is eliminated by employing the present invention in the form described.

To construct this new type of parallel-plate mirror analyzer, there is inserted in the space between the usual parallel plates, a tube of resistive material having an inside diameter somewhat larger than $d$, whereby the entrance and exit apertures are symmetrically located on the diameter of the circular cross section of the tube. The height of the tube is designated D. Good electrical contact is established between the two plates and the ends of the tube. The wall thickness of the tube, which must be uniform but is within practical limits arbitrary, is designated $t$. The material of the plates extending beyond the outer diameter of the tube is superfluous and may be eliminated, thus greatly reducing the size of the required device. The resulting structure is a "pillbox" with a resistive tube body, metallic ends, and entrance and exit apertures in one end.

Within the resistive material a current is caused to flow in response to the applied voltage difference V.

The resistance of the tube from end to end is $$R = \frac{1}{\sigma} \frac{D}{\left(\pi\left(\frac{d}{2} + t\right)^2 - \pi\left(\frac{d}{2}\right)^2\right)}$$

Therefore, the current through the tube is $$I = \frac{\sigma V}{D}\left(\pi\left(\frac{d}{2} + t\right)^2 - \pi\left(\frac{d}{2}\right)^2\right)$$

and the current density is $$\vec{j} = \sigma \frac{V}{D} \hat{z}$$

where $z$ is a unit vector parallel to the tube axis. It follows that the electric field in the resistive material, and thus inside the adjacent enclosed pillbox is $$\vec{E} = \frac{V}{D} \hat{z}$$

which is the electric field which would exist between the plates in the absence of the resistive tube if the plates extended to infinity and were therefore free of fringe field effects. The device, with resistive tube, marks an important improvement over the prior art device with large plates in that the device is physically smaller and more precisely produces the desired electric field shape.

In another embodiment of this device, the end plate containing the entrance and exit apertures are removed and replaced with a simple electrical connection to a metallic conducting coating on that end of the tube. Although performance is somewhat poorer than where the end plate and apertures are present, the absence of apertures removes constraints on careful alignment of the incident beam. In this embodiment, all entering ions below a maximum energy determined by the dimension D are reflected as previously discussed, but the reflected beam is dispersed into a plane with the lowest energy ions undergoing the smallest lateral displacement. The maximum energy which is reflected without loss on the remaining plate is given by $$eW_{max} = 2eV$$

provided that the diameter $d$ is sufficiently large that ions satisfying this criterion are not lost by collisions with the tube walls.

Other objects, adaptabilities and capabilities of the invention will be appreciated as the description progresses, reference being made to the accompanying drawings, in which:

BRIEF DESCRIPTION OF THE DRAWINGS

FIG. 1A illustrates the invention in cross-section wherein a tube of resistive material carries a current which results in a uniform internal electric field suitable for changing the energy of an ion beam;

FIG. 1B similarly illustrates an alternative embodiment wherein the external diameter of the tube varies systematically as a function of axial position, thereby producing a non-uniform internal electric field as may be required in specific applications;

FIGS. 2A and 2B illustrate for purposes of comparison two prior art techniques used to produce results similar to those obtained by means of devices illustrated in FIGS. 1A and 1B.

FIG. 3 is a sectional view of a tapered resistive disk carrying a radial current which produces an electric field that decreases in nearby space as the inverse square of the distance from a central point;

DESCRIPTION OF THE PREFERRED EMBODIMENTS

Figure 4:
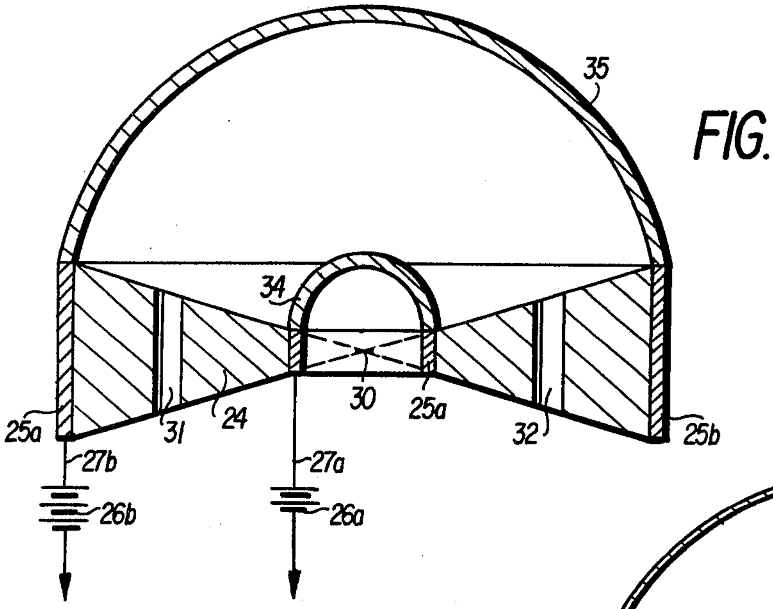
FIG. 4 is a view similar to FIG. 3 which illustrates a modified embodiment of the concept illustrated in FIG. 3, applicable to the field of ion energy analysis, wherein a central convex metallic hemisphere and a bounding concave metallic hemisphere improve the regularity of the electric field in the region of interest, entrance and exit apertures for an ion beam also being provided.

FIG. 1A depicts in cross-section an illustrative form of the invention in which a simple tube of homogeneous resistive material 10 is connected by means of conducting metallic coatings **11*a* and 11*b* via conductors 16*a* and 16*b* to low output impedance power supplies 12*a* and 12*b* of differing voltage. The current which flows in the resistive tube 10 causes the presence of an electric field 14 inside the tube, such electric field being suitable for accelerating and focusing an ion beam 15. It will thus be appreciated that ions from a source (not shown) on the left as seen in FIG. 1A enter tube 10 where they are subjected to a uniform axial electric field, are accelerated at a constant rate by electric field 14 and emerge as a focused ion beam 15**.

Illustrated by FIG. 1B is a tube **10*a* of appropriate resistive material which has an increasing thickness from metallic coating 11*c* to metallic coating 11*d* to produce within tube 10*a* a non-uniform electric field for controlling ion beam 15*a*. Coatings 11*c* and 11*d* are connected via conductors 16*c* and 16*d* to low output impedance power supplies 12*c* and 12*d*** respectively. It will be appreciated that as the resistive material becomes thicker, the current density decreases and, in consequence, the strength of the electric field also decreases.

In FIG. 1B the density of the surface current increases from right to left, as seen in the figure, and this, in turn, creates a non-uniform electric field increasing also from right to left within tube **10*a*. As a result, ions entering from the right, as seen in the Figure, are accelerated at an increasing rate and, as a result of an exponentially varying axial field so provided within tube 10*a*, large changes are produced in the energy of ion beam 15*a*. Accordingly, it will be appreciated that the optic device illustrated in FIG. 1B** constitutes an exponential acceleration or deceleration lens which is achieved by exponentially changing the outside diameter of the tube.

FIGS. 2A and 2B illustrate how the same end is accomplished by prior art devices, and thus serves to emphasize the reduction in complexity and fabrication cost afforded by implementation of the instant invention. In FIG. 2A two plate electrodes **17*a* and 17*b* provided with central portions of fine mesh 20*a* and 20*b* are connected to the electrical power supplies as in FIG. 1 and with the same reference numerals applied to corresponding features. In FIG. 2B another prior art apparatus is depicted in which an array of plate electrodes 21 is connected to a voltage divider 22 to provide an effect similar to that obtained from the device illustrated in FIG. 1A, but with greater costs and complexity. In this form of prior art embodiment the voltage divider 21 may alternatively provide nonuniform voltage increments which are advantageous in certain applications, such as in making large changes in the energy of an ion beam, of which case an exponential divider is preferred; such an exponentially varying field may also be produced, with certain advantages, through a variation of the concept illustrated in FIG. 1A, wherein the outer diameter of tube 10 changes exponentially as a function of axial position as illustrated in FIG. 1B. Thus the tube 10*a* described with reference to FIG. 1B, properly dimensioned, functions in the such manner. However, the same result is obtainable with example shown in FIG. 1A where the material is silicon and is implanted with boron to vary the resistivity of tube 10** axially as desired, within limits.

A simple form of a 180° deflection electrostatic energy analyzer employing the method of the invention is illustrated in cross-section in FIG. 3. A symmetric biconcave conical device 24 is formed of resistive material as described, to which are attached cylindrical metallic connectors on the inside diameter 25a and outside diameter 25b as means of connecting sources of electromotive force 26a and 26b via conductors 27a and 27b respectively. This device produces in the region surrounding it an electric field which varies as the inverse square of the distance from the central point 30. In this embodiment and the following embodiments the symmetric bi-concave conical shape is illustrated for ease of conceptual description, but the device operates equally well plano-concave conical or asymmetrically bi-concave conical or concave-convex conical, so long as the taper projects at center 30 to zero thickness. By placing an ion source between the metallic conductors 25a and 25b on one side of the disc device 24 and placing detector means for receiving said ions diametrically opposite on the other side of the disc across center 30, a selected energy band of ions is received by the detector means depending upon the current density produced in the disc device 24 by the voltage sources comprising electromotive forces 26a and 26b.

FIG. 4 illustrates an improved form of the invention wherein apertures 31 and 32 in diametrically opposed locations are provided for the entrance and exit of ions. If ions with a broad energy range enter entrance 31, their charge being positive, they are deflected toward exit 32, and those ions within a selected small energy range are received through exit aperture 32, and all others being lost by impact onto the resistive disk 24 or, when of sufficiently high energy, onto other nearby surfaces. As additional optional improvements, spherical metallic surface 34 extending from the inner diameter or surface 35 from the outer diameter or both are provided to combine the virtues of prior art concentric hemispherical energy analyzers of this type with the improved characteristics of the present invention. For more detailed information as to the use of hemispherical analyzers, reference is made to J. A. Simpson, Rev. Sci. Inst. 35 (1964) 1698, C. E. Kuyatt and J. A. Simpson Rev. Sci. Inst. 38 (1967) 103, and E. M. Purcell, Phy. Rev. 54 (1938) 818.

Figure 5:
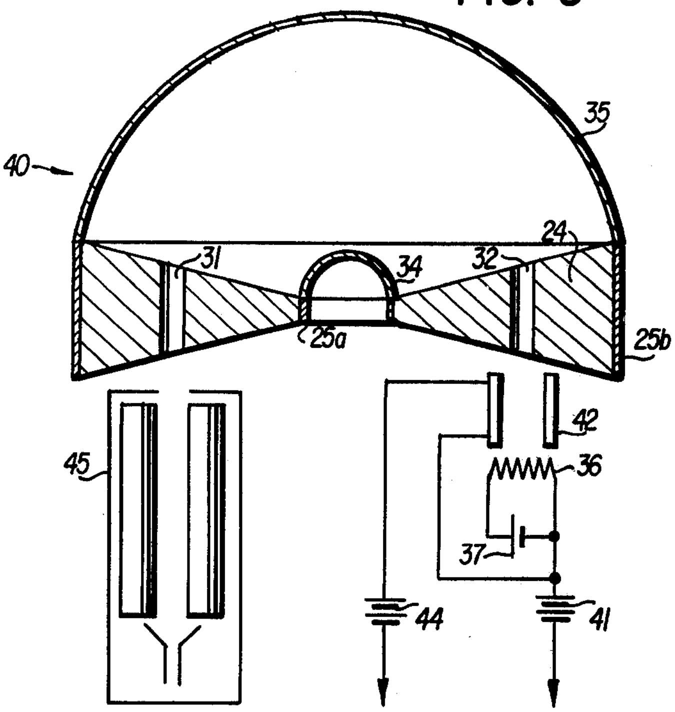
FIG. 5 schematically depicts an application wherein the embodiment illustrated in FIG. 4 is applied in a system containing an ion source, ion focusing lens as is shown in FIG. 1A, and an ion detector which for purposes of illustration is shown as a quadrupole mass filter with a particle multiplier detector.

FIG. 5 illustrates a specific application of the invention with, however, certain details omitted, for the sake of clarity. Here an ion source 36 depicted as a thermionic emitter but which also may be any of a number of other means for producing ions well known to the art is interfaced to the energy analyzer designated generally by reference numeral 40.

This ion source is heated by power supply 37 and raised to an appropriate potential by voltage source 41. A lens element 42 as described for FIG. 1A is composed of a cylinder of appropriate resistive material. Through element 42, an electrical current is caused to flow by virtue of the potential difference between power supply 41 and an auxiliary voltage supply 44, the purpose of this lens element 42 being to accelerate ions from source 36 to an appropriate energy, as well as to focus them into the entrance aperture 32 of analyzer 40. An ion detecting device 45, here a quadrupole mass spectrometer system which but alternatively may be of any other type of ion detecting device, with or without mass analysis, is positioned to receive ions from exit aperture 31. The required enclosure for a vacuum is omitted from the figure for clarity. In the embodiment shown in FIG. 5, ions generated from source 36 are received in the lens 42 wherein they are accelerated and focused to pass through the entrance aperture 32. Then, depending upon the current density produced in the disk device 24, only ions of a selected energy band are transmitted so that they are discharged through the exit aperture 31 to be received by the quadrupole mass filter 45 for segregation in accordance with their charge-to-mass ratios in a manner well known to the art.

Figure 6:
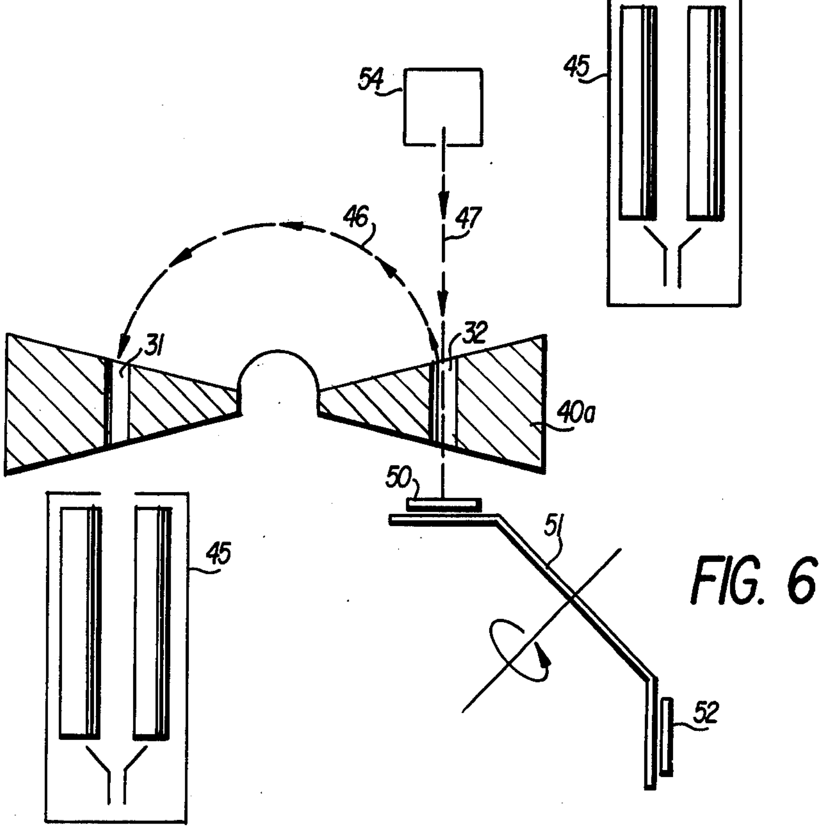
FIG. 6 diagrammatically illustrates an application of the inventive concepts to the field of secondary ion mass spectrometry requiring ion energy analysis wherein the source of ions for energy analysis is a surface under bombardment by a high energy ion beam which, by virtue of its high energy, is affected only negligibly by the electric field of the energy and analyzing device.

An application of the invention relating to the art of secondary ion mass spectrometry is shown in FIG. 6, wherein secondary ions 46 are released from a surface by bombardment with a high energy ion beam 47, the nature of these secondary ions yielding analytical information about the composition of the surface. To obtain good mass analysis characteristics it is necessary, in this art, to select for observation only those secondary ions of relatively low kinetic energy. Thus, an energy analyzer 40a has disposed below its entrance aperture 32, a sample wafer 50 mounted on a carousel device 51 which, shown only in part, also contains other sample wafers 52. Sample 50 is bombarded by a high energy ion beam 47 from source 54 by a trajectory through aperture 32. The ions in beam 47 by virtue of their high energy are negligibly deflected by the field of the energy analysis device 40a. Secondary ions from the sample 50 pass through entrance aperture 32 and, if of the appropriate kinetic energy, follow trajectories such as indicated by ion beam 46, carrying them to the exit aperture 31 where they are detected by mass spectrometer 45, shown as the quadrupole type, but not restricted thereto.

Figure 7:
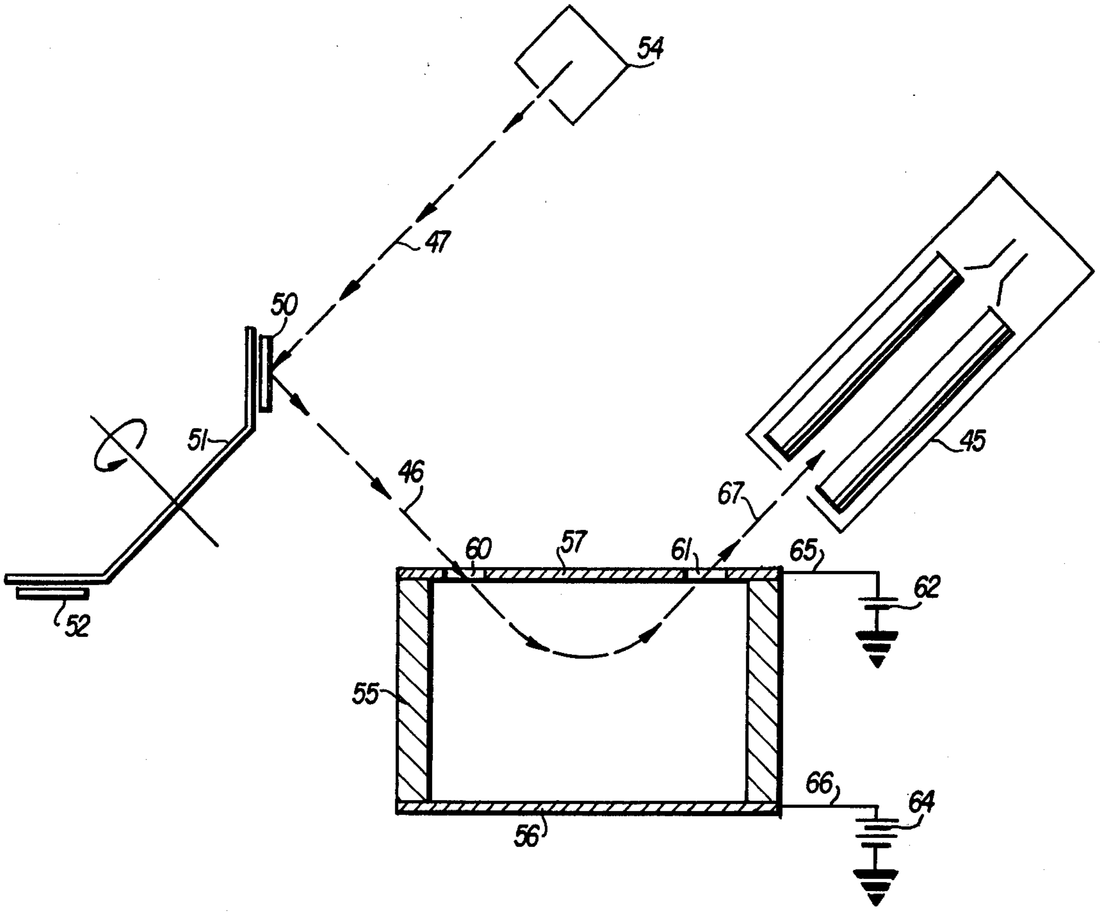
FIG. 7 diagrammatically illustrates application of the concept similar to that illustrated in FIG. 6, except that the ion energy analyzer is a 45° mirror type rather than a spherical field type.

FIG. 7 is directed to another application of the invention to the art of secondary ion mass spectrometry. In this case, however, the secondary ion energy analysis is of the parallel plate mirror type referred to previously, thereby allowing a different geometrical arrangement than depicted in FIG. 6, and providing certain advantages with respect to the adaption of existing apparatus to the technique of secondary ion mass spectrometry. Here a high energy ion source 54 emits an ion beam 47 onto a target sample 50 mounted on a carousel 51 containing other samples such as sample 52. The resulting secondary ion beam 47 is energy analyzed by the device comprising a resistive tube 55 of appropriate resistive material, as described, with bottom plate 56 and top plate 57 composed of electrically conductive material containing entrance aperture 60 and exit aperture 61, the plates being connected to power supplies 62 and 64, as shown via conductors 65 and 66 respectively. The reflected and energy analyzed secondary ion beam 67 is directed into the mass analysis device 45 as previously described.

Although preferred embodiments of the invention are described above, it is to be understood that the invention is capable of other adaptations and modifications within the scope of the appended claims which therefore should be construed as covering not only corresponding stucture, material and steps described in the specification, but also equivalent thereof.

Then having thus described by invention, what I claim is new and desire to secure by letters patent by the United States is:

1. In a method of establishing electric fields in an ethereal medium for the collection of selected ions, the use adjacent to said medium of a resistive material through which a predetermined electric current flow density is produced by applying different potentials to said material at spaced locations thereon, thereby generating a predetermined electric field in said adjacent medium, the method comprising the controlled selection by spatial focusing of a portion of ions having predetermined physical properties in said medium adjacent said resistive material by the electric field so established and the collection of said portion of ions.

2. A method in accordance with claim 1, wherein said material has a resistivity within the range of about $10^3$ to $10^6$ ohm-centimeters.

3. A method in accordance with claim 2 wherein said material is amorphorous carbon.

4. A method in accordance with claim 2 wherein said material is a ferrite.

5. A method in accordance with claim 2 wherein said material is a leaky dielectric.

6. A method in accordance with claim 2 wherein said material is rock.

7. A method in accordance with claim 1 wherein said material has a resistivity within the range of about $10^{-4}$ to $10^3$ ohm-centimeters.

8. A method in accordance with claim 1 wherein said material has a resistivity within the range of about $10^6$ to $10^8$ ohm-centimeters.

9. A method in accordance with claim 1 wherein said material has a resistivity within the range of about $10^8$ to $10^{10}$ ohm-centimeters.

10. A method in accordance with claim 1 wherein the shape of said material provides at least in part said controlled selection of the ions.

11. A method in accordance with claim 1 wherein said controlled selection of ions comprises the segregation of the ions by their kinetic energy.

12. A method in accordance with claim 1 wherein said material is an ion optic device in the form of a tube having a uniform resistivity throughout and providing a constant axial field thereby causing linear change in the velocity of ion beams received therein.

13. A method in accordance with claim 1 wherein said material is an ion optic device in the form of a tube which has a predetermined non-uniform resistivity distribution and which produces therein a non-uniform electric field for causing a predetermined nonlinear change in the velocity of ion beams received therein.

14. In a method of establishing a non-uniform field in an ethereal medium, the use adjacent to said medium of a resistive material through which a predetermined electric current flow is produced by applying different potentials to said material at spaced locations thereon, said material having prearranged variations in its resistivity, the method comprising the controlled selection by spatial focusing of ions having predetermined physical characteristics in said medium adjacent said material by the electric field so established.

15. A method in accordance with claim 14 wherein the variations in the resistivity of said material are provided by introducing a substance therein in prearranged amounts at prearranged locations.

16. A method of the selection by spatial focusing of a portion of ions having predetermined physical characteristics in an ethereal medium which comprises the steps of:

providing within an ethereal medium a shaped structure composed of a material having a resistivity in the range of $10^{-2}$ to $10^8$ ohm centimeters;

applying a voltage differential between two locations on said structure to produce an electric field which is effective proximate said structure;

introducing ions into the said effective electric field of said structure; and causing predetermined relatively large changes in velocity and direction of at least a portion of said ions having selected physical characteristics by controlling the current density produced between said locations in said structure by its geometry, its resistivity and the voltage applied thereto and collecting only said portion of ions at a predetermined location.

17. A method in accordance with claim 16 wherein a a hollow cylindrical configuration is provided said structure, the ends of the cylindrical structure constituting the locations where said different voltages are applied, the effective electric field influencing said ions being within said cylinder.

18. A method in accordance with claim 17 wherein said cylindrical structure is composed of homogenous material having a uniform thickness and being of uniform resistivity throughout, the interior and exterior diameter of said structure each being constant.

19. A method in accordance with claim 17 wherein said cylindrical structure is composed of homogenous material having an exponentially increasing outside diameter and a constant interior diameter from one end to the other thereby producing an exponentially varying axial field within said structure whereby large changes in the energy level of said portion of ions traversing through said structure are produced.

20. A method of influencing ions in an ethereal medium which comprises the steps of:

providing within an ethereal medium a structure comprising a disk composed of material having a resistivity in the range of $10^{-2}$ to $10^8$ ohm-centimeters and a uniform thickness at its outer periphery and zero thickness at its center wherein an opening is provided;

applying a voltage differential between said outer periphery and an inner periphery defining said opening to produce an electric field which is effective proximate said disk, the geometry of said disk between said peripheries being such that the current density in said disk decreases as the inverse square of the distance from the center of said disk;

introducing ions into said effective-field of said disk; and causing predetermined relatively large changes in velocity and direction of said ions by controlling the current produced between said outer and inner peripheries by the geometry and resistivity of said disk and the voltages applied thereto.

21. A method in accordance with claim 20 wherein at least one face of said disk configured structure coincides with a conical surface whereby the thickness of said structure is a function of its distance from the center thereof.

22. A method in accordance with claim 21 wherein apertures are provided in said structure at symmetrically opposed locations, ions within a limited range of energies entering by one of said apertures being deflected by the electric field produced by said structure whereby they exit by the other said aperture, and ions not in said limited range of energies being deflected whereby they miss said exit aperture.

23. A method in accordance with claim 20 wherein said voltage differential causes a current to flow in said disk in a radial direction whereby the electric field E which results in in said material as a function of the distance $r$ from said center is also in a radial direction and of magnitude represented by the formula $$E(r) = \frac{V_o - V_f}{\frac{1}{r_o} - \frac{1}{r_f}} \frac{1}{r^2}$$

where $V_o$ is the voltage applied at the inner periphery at radius $r_o$ and $V_f$ is the voltage applied at the outer periphery at radius $r_f$.

24. A method in accordance with claim 20 wherein said ions introduced into the vicinity of said structure comprise a spray of secondary ions, a solid target of a substance to be analyzed being bombarded by a beam having sufficiently high kinetic energy to produce said spray of secondary ions.

25. A method in accordance with claim 24 wherein said beam is received via said entrance opening in said disk moving in a direction therethrough opposite said secondary ions.

26. A method in accordance with claim 25 wherein said secondary ions received through said exit opening are received by a mass filter and are separated in accordance with their mass-to-charge ratios.

27. A method in accordance with claim 26 wherein said mass filter is a quadrupole mass filter.

28. A method of influencing ions in an ethereal medium which comprises the steps of:

providing within an ethereal medium a structure of hollow configuration having opened ends and parallel sides of uniform resistivity in the range of $10^{-2}$ to $10^8$ ohm-centimeters, said opened ends each defining a plane perpendicular to said sides, placing a pair of parallel metal plates across said opened ends whereby said plates are parallel, applying voltages to said plates whereby fringe field effects within said hollow structure between said plates and said sides are eliminated, and providing a pair of spaced apart apertures in one of said plates;

introducing ions into said structure through one of said apertures;

causing predetermined large changes in velocity and direction of said ions within said structure by controlling the current density in said sides by their geometry, their resistivity and the voltages applied to said plates, said apertures being spaced apart a predetermined distance, whereby only ions in a predetermined energy range which enter said one aperture exit through the other of said apertures.

29. A method in accordance with claim 28 wherein said ions received in said entry aperture comprise a spray of secondary ions, a solid target of substance to be analyzed being bombarded by a beam of particles of sufficient energy to produce said spray of secondary ions.

30. A method in accordance with claim 29 wherein said beam impacts on said substance at an angle of 45° and said ions enter said entry aperture and leave said exit aperture at 45° relative to said plate containing said apertures.

31. A method in accordance with claim 30 wherein said secondary ions traversing said exit aperture at 45° are received and separated according to their mass-to-charge ratios by a mass filter.

32. A method in accordance with claim 31 wherein said mass filter is a quadrupole mass filter.

33. Apparatus for establishing electric fields in an ethereal medium for the purpose of selecting a portion of ions having predetermined physical characteristics moving through said medium, the apparatus comprises: a structure disposed adjacent the ethereal medium composed of a material for receiving electric current flow, said material having a resistivity in the range of $10^{-2}$ to $10^8$ ohm-centimeter; a first location on said structure receiving a first voltage; a second location on said structure receiving a second voltage different from said first voltage whereby a current flows through said structure from said first location to said second location, said current having a predetermined density in said structure at any location proximate the surface thereof; said current density being governed by the geometry of the structure, its resistivity and the selected voltage applied thereto and thereby establishing the strength and direction of the electric field generated by said surface in the adjacent ethereal insulating medium; an exit at a further location in the apparatus for receiving said portion of ions having predetermined physical characteristics; and ion collection means associated with said exit for receiving ions therefrom.

34. Apparatus in accordance with claim 33 wherein said structure is in the form of a disk with an opening at its center, said first location being along the outside periphery of said disk, said second location being along the sides of said disk defining said opening, the current density flowing in said disk decreasing as in the inverse square of the distance from the center of the disk.

35. Apparatus in accordance with claim 34 wherein said disk has at least one side coincident with the surface of a cone with a thickness of the disk decreasing to zero at its center, said material having a uniform resistivity throughout.

36. Apparatus in accordance with claim 35 wherein said disk has a bi-concave conical taper, the center of said disk being the co-apex of said conical tapers.

37. Apparatus in accordance with claim 35 wherein said disk has a plano-concave conical taper.

38. Apparatus in accordance with claim 34 wherein said disk has a uniform thickness, the resistivity of said disk varying as a function of the distance from the center of the disk whereby said resistivity has a gradient that at any location on the disk its value is inversely proportional to the distance thereof from the center.

39. Apparatus in accordance with claim 34 wherein an entrance aperture and said exit comprising an exit aperture are provided said disk at equal distances from the center opening opposite each other relative thereto, means for producing ions proximate said entrance aperture, said ions entering said entrance aperture having a predetermined limited range of energies being guided by said electric field whereby they are discharged through said exit aperture.

40. Apparatus in accordance with claim 35 wherein said ion collection means comprises a mass filter is provided to receive said discharged ions.

41. Apparatus in accordance with claim 40 wherein said mass filter comprises a quadrupole mass filter.

42. Apparatus in accordance with claim 34 wherein an ion source is positioned on one side of said center opening and said exit for receiving said selected portion of said ions from said ion source is located on the other side of said center opening.

43. Apparatus in accordance with claim 34 wherein an inner hemisphere of metallic conducting material is mounted about the center of said disk whereby it coincides at least in part with said opening at the center of said disk.

44. Apparatus in accordance with claim 34 wherein an outer hemisphere of metallic conducting material is mounted to coincide at least in part with the outer periphery of said disk.

45. Apparatus in accordance with claim 44 wherein said outer hemisphere comprises a mesh.

46. Apparatus in accordance with claim 34 wherein said current flows in a radial direction in a disk whereby the electric field E as a function of the distance $r$ from the center of the disk is also in radial direction and of magnitude represented by the formula $$E(r) = \frac{V_o - V_f}{\frac{1}{r_o} - \frac{1}{r_f}} \frac{1}{r^2}$$

wherein $V_0$ is the voltage applied at the outer periphery radius $r_0$ and $V_f$ is the voltage applied at the sides of the disk defining said opening and having the radius of $r_f$.

47. Apparatus in accordance with claim 46 wherein an ion source is positioned whereby ions may be received in said electric field by a first position between $r_f$ and $r_0$, said ions' source comprising secondary ions produced by bombardment of a solid target by a beam of particles of sufficient energy to eject said secondary ions from said target, and said collection means for detecting said selected portion of said secondary ions at a position symetrically across said central opening from said ion receiving position.

48. Apparatus in accordance with claim 47 wherein said collection means comprises a mass spectrometer system.

49. Apparatus in accordance with claim 48 wherein said mass spectrometer system comprises a quadrupole mass filter.

50. Apparatus in accordance with claim 33 wherein said structure is in the form of an enclosing wall which is adapted to eliminate undesirable fringe field effects, parallel metallic conducting plates being connected to the upper and lower edges of said wall, each of said plates being connected to a voltage source whereby an electric field is produced within the enclosure defined by said wall, a pair of apertures provided in the upper of said plates leading to said enclosed space whereby the apparatus functions as a 45° incident electrostatic mirror energy analyzer for ions received at an incident angle of 45° through one said aperture, said exit comprising the other said aperture, a portion of said ions in a limited energy band being deflected by the electric field in said enclosed space whereby they are discharged through the other said aperture.

51. Apparatus in accordance with claim 50 wherein said ions comprise a spray of secondary ions ejected from a solid target provided proximate said one aperture, a source for a primary beam of particles bombarding said solid target with kinetic energy sufficient to eject therefrom said secondary ions.

52. Apparatus in accordance with claim 51 wherein said ion collection means comprises a mass spectrometer system is provided proximate said other aperture to receive ions discharged therethrough.

53. Apparatus in accordance with claim 52 wherein said mass spectrometer system comprises a quadrupole mass spectrometer.

54. Apparatus in accordance with claim 51 wherein said solid target is disposed at an angle of 90° relative to said upper plate, said beam of particles striking said target at an angle relative thereto of 45°, said spray of secondary ions being ejected at an opposite angle of substantially 45° relative to said target for receipt in said one aperture.

55. Apparatus in accordance with claim 54 wherein said ion collection means comprises a quadrupole mass filter is provided whereby it is oriented relative to said upper plate at an angle of 45° to receive secondary ions discharged from said other aperture.

56. A method of generating an electric field for causing controlled movement of ions therethrough, the method comprising the steps of providing a shaped structure composed of a physically self-sustaining material having a resistivity in the range of $10^{-2}$ to $10^8$ ohm centimeters; applying a voltage differential between two locations on said structure to produce an electric field adjacent said structure; introducing ions into said electric field; and causing predetermined controlled movement of the ions through said field by controlling the current density produced between said locations in said structure by its geometry, its resistivity and the voltages applied thereto.

57. Apparatus for generating electric fields for the purpose of causing movement of ions through said fields, the apparatus comprising a shaped structure composed of a physically self-sustaining material for receiving an electric current flow, said material having a resistivity in the range of $10^{-2}$ to $10^8$ ohm centimeters; a first location on said structure receiving a first voltage; a second location on said structure receiving a second voltage different from said first voltage whereby a current flows through said structure from said first location to said second location, said current having a predetermined density in said structure at any location proximate the surface thereof; said current density being governed by the geometry of the structure, its resistivity and the selected voltage applied thereto and thereby establishing the strength and direction of the electric field generated by said surface through which the ions to be moved are received.

58. Apparatus in accordance with claim 57 wherein structure is in the form of a tube.

59. Apparatus in accordance with claim 58 wherein said tube has a constant internal and external diameter throughout and is of uniform resistivity, said first location comprising one end of said tube and said second location comprising the other end of said tube, said first and second voltages producing an uniform current density between said locations.

* * * * *